United States Patent Office 3,343,772
Patented Sept. 26, 1967

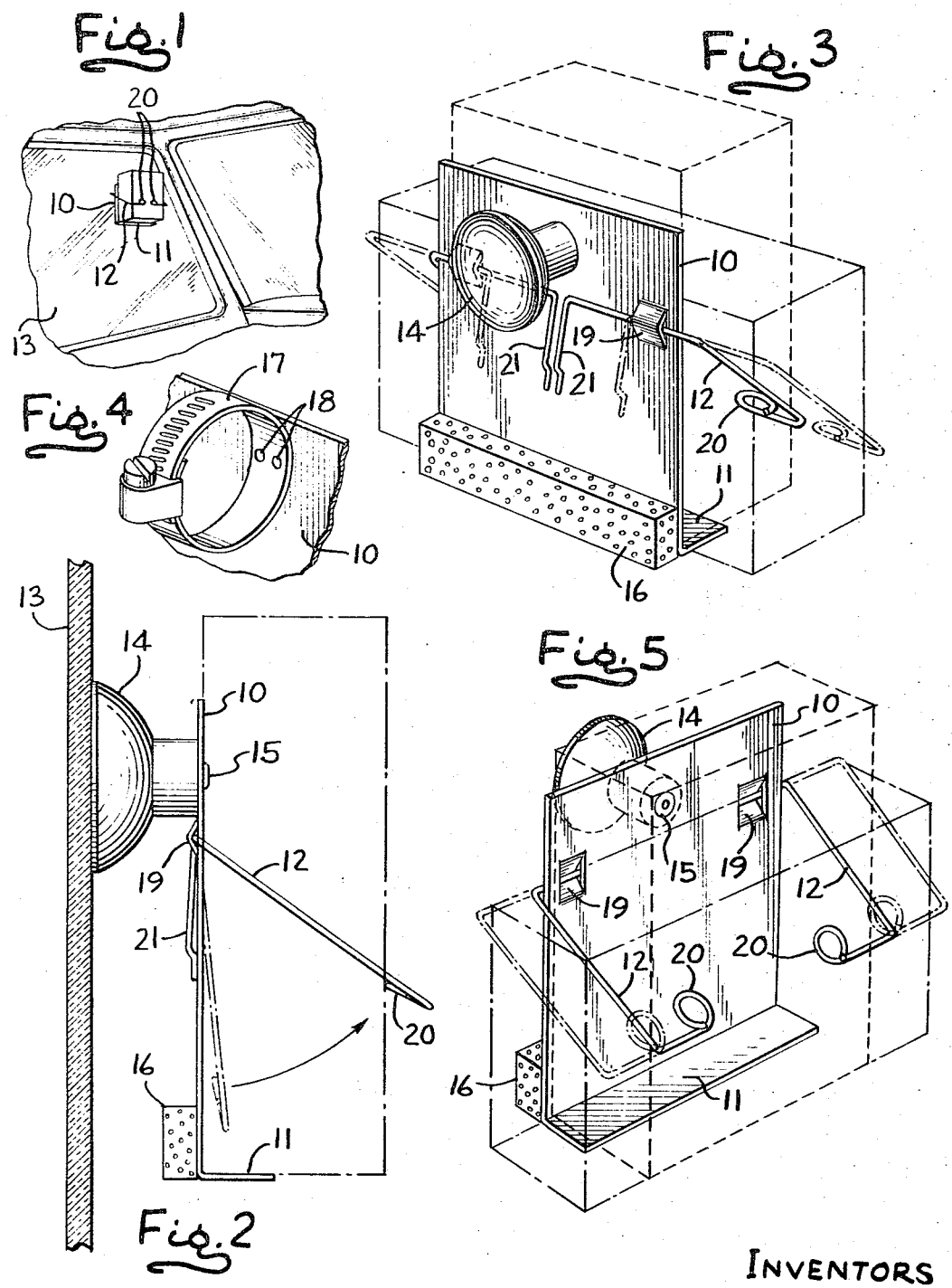

3,343,772
ATTACHMENT DEVICE FOR SMALL
APPLIANCES
Thomas G. Howell, 603 Bob-O-Link, Mount Prospect, Ill. 60056, and A. Byron Collie, Chicago, Ill.; said Collie assignor to said Howell
Filed Oct. 24, 1965, Ser. No. 504,835
4 Claims. (Cl. 248—206)

ABSTRACT OF THE DISCLOSURE

A holder for small appliances is disclosed which incorporates a rigid back having a lower ledge against which the appliance is resiliently urged by a pair of laterally adjustable spring wire arms. The arms are slidable in their journals and torsionally resilient over a wide range of movement to accommodate appliances of varying dimensions.

---

This invention relates generally to attachment devices, and more particularly concerns a mounting bracket for securely but releasably fastening a small appliance such as a transistor radio to various types of vehicles.

Among the factors contributing to the current popularity of transistor radios are the advantages of small size, light weight, rugged construction and low cost which set the transistor receiver apart from its tube-type predecessors. Being battery-powered and entirely self-contained, the miniature transistor receiver may be easily moved from one location to another, placed anywhere and in any attitude, or even carried about on the person. These factors of convenience and portability have naturally led to their use in automobiles, where they often take the place of permanently installed units. In taxis, trucks and certain off-the-road vehicles, provision is seldom made for permanently installed broadcast-band radios. The same is often true of large fleets of company-owned vehicles which are maintained for the use of sales personnel or others who travel a great deal. Drivers of these vehicles will often take their own personal transistor radios with them so that they may enjoy listening while traveling about in the performance of their duties.

When a transistor radio is employed in a motor vehicle, however, reception difficulties often arise which are not present among other surroundings. A transistor radio is seldom equipped with an external antenna, and when situated within a metal vehicle it is generally so surrounded and enclosed by metal structure that radio signals are either seriously degraded or blocked out altogether. For this reason, it is essential that it be placed adjacent a window or other unshielded opening so that the radio signals may reach the receiver unimpeded. In most vehicles, this is impossible without a special arrangement to hold the radio securely in a favorable place for reception while the vehicle is in motion. While the radio must of course be securely held, it should also be freely releasable for removal from the vehicle when the operator leaves, or for transfer to another vehicle.

The lightness and portability of transistor radios makes them equally suitable for other types of vehicles. Among them may be included bicycles, motorcycles, motorscooters, boats, self-propelled golf carts, and any other vehicle in which provision is not normally made for a permanently installed radio. In all of these applications, the need for a secure but releasable mounting bracket is evident.

It is therefore an object of the present invention to provide an improved mounting bracket for releasably attaching a small radio or other appliance, which bracket is easily adjustable to accommodate appliances of varying sizes and shapes. A related object is to provide a bracket which permits secure mounting of a radio in a location of maximum signal strength within a vehicle without interfering with the normal operation of the radio.

Another object is to provide a mounting bracket of the above description which is of rugged design, while being of simple construction and adaptable for inexpensive mass production.

A further object is to provide a bracket of the above description which permits positive attachment of a small radio to either a structural member of a vehicle, such as a bicycle handlebar, or to a smooth upright surface such as an automobile window or dashboard without defacing the mounting surface or requiring permanent attachments to the mounting area.

Other objects and advantages of the invention will become apparent upon reading the following detailed description and upon reference to the drawings, in which:

FIGURE 1 is a perspective of a transistor radio mounted to an automobile window by the bracket of the present invention;

FIG. 2 is an elevation of the bracket of FIG. 1;

FIG. 3 is a rear perspective of the bracket of FIG. 1, with the bracket shown in two alternative configurations;

FIG. 4 is an alternative attaching means for the bracket of FIG. 3; and

FIG. 5 is a front perspective of the bracket of FIG. 3.

While the invention will be described in connection with a preferred and an alternative embodiment, it will be understood that we do not intend to limit the invention to those embodiments, but intend to cover all alternatives, modifications, and equivalents as may be included within the spirit and scope of the invention as defined in the appended claims.

Turning now to the drawings, in FIG. 1 there is shown the mounting bracket of the present invention supporting a typical transistor radio on an automobile door window, where it may receive incoming signals without interference from the automobile structure. The back plate 10 is preferably constructed of sheet metal and is provided with a shallow ledge 11 at its base for the purpose of supporting the lower portion of the transistor radio. A spring wire arm 12 extends from behind each side of the back plate 10 to embrace and resiliently press the radio downward and backwards against the back plate 10 and ledge 11. In the first embodiment shown, the device is secured to an automobile window 13, or to any other smooth surface, by a suction cup 14 which is mounted by a rivet 15 to the back plate 10. In addition, a foam rubber strip 16 is provided at the base of the back plate 10 to prevent the metal portion of the bracket from hitting the window 13 while the vehicle is in motion. The strip 16 is not normally in contact with the window 13, but merely serves as a bumper. The entire weight of the bracket and attached radio is borne by the mounting means, which in this embodiment comprises the suction cup 14. As an alternative mounting means, a clamp 17 may be provided as shown in FIG. 4. The clamp 17 is similarly attached by rivets 18 to the back plate 10, and furnishes a convenient mounting means for attaching the bracket to the handlebar of a bicycle, motorcycle, or similar vehicle.

It is a feature of the invention that the arms 12 are adjustable to accommodate radios of varying dimensions. To accommodate varying back-to-front thickness, as well as to securely hold the radio in place against the back 10 and ledge 11, the arms 12 are pivotably received in punched-out journals 19 within the plate 10, so that the forward-extending portions of the arms 12 are swingable about an axis parallel to the ledge 11. The forward-extending ends of the arms 12 turn 90° inward, ending in loops 20 which serve to pull the radio firmly into the bracket from the front. The loops 20 are provided so that no sharp edges are present which might mar the radio. The arms 12 thus press against the radio at only two points so that access to the radio control is unimpeded and the original appearance of the radio is unaltered. At the rear of the bracket, a portion of each arm 12 extends laterally through the journals 19, which in the preferred embodiment are constructed by punching shallow ridges in the back plate 10 to form short passages in which the arms 12 are retained, while still allowing them to rotate. Each arm terminates in an end segment 21 which turns downward to form a leg, thereby restricting the angular travel of the arm 12 so that it is restrained at its inner end as the loop 20 is lifted to accommodate a radio placed in the bracket.

As a feature of the invention, the resilient torsional properties of the journalled portions of the arms 12 are utilized to obtain the spring force by which the radio is held against the bracket. With no radio in place, each arm 12 will tend to assume the position shown in phantom in FIG. 2. When the arm 12 is lifted to allow a radio to be set in place against the back 10 and ledge 11, the journalled segment of the arm 12 must be twisted against the fixed leg 20 which bears against the back 10. The restoring force thereby supplied from the spring action of the arm 12 tends to hold the radio securely against the bracket. The natural direction of twist given to the arm 12 in accommodating a radio tends to force the radio both downward toward the ledge 11 and inward against the back 10, thereby holding it securely but releasably in place.

We claim as our invention:

1. An adjustable mounting bracket for small appliances comprising, in combination, a back plate, means on said back plate for attachment to a fixed object, a ledge carried by said back plate extending in a forward direction away from said object, journal means on said back plate for rotatably and slidably carrying a spring wire arm laterally of each side of said back plate, a torsionally resilient spring wire arm carried by said journal means laterally of each side of said back plate, an extension at one end of each of said arms extending in a forward direction from said back plate and terminating in an inwardly-turned tip adapted to embrace an appliance positioned therein, and an offset dog at the other end of each of said arms adapted to engage said back plate and hold said other end against rotation relative to said back plate when said extension and arm are resiliently extended to accept and accommodate an appliance.

2. The mounting bracket defined in claim 1 in which the means for attachment includes a suction cup.

3. The mounting bracket defined in claim 1 in which the means for attachment includes an adjustable clamp.

4. A mounting bracket as defined in claim 1 in which said back plate is constructed of sheet metal in which said journal means includes punched-out longitudinal ridges in said plate having an opening at each end through which said spring wire arms are rotatably and slidably journaled.

References Cited

UNITED STATES PATENTS

| 895,706 | 8/1908 | Winey | 24—261 |
| 2,879,967 | 3/1959 | Anderson | 248—316.3 |
| 3,212,743 | 10/1965 | Culver | 248—313 |

FOREIGN PATENTS

| 876,073 | 8/1961 | Great Britain. |

CHANCELLOR E. HARRIS, *Primary Examiner.*

R. P. SEITTER, *Assistant Examiner.*